(12) United States Patent
Rainovic et al.

(10) Patent No.: US 9,787,488 B1
(45) Date of Patent: Oct. 10, 2017

(54) PASS-THROUGH MULTICAST ADMISSION CONTROL SIGNALING

(71) Applicant: Juniper Networks, Inc., Sunnyvale, CA (US)

(72) Inventors: George Rainovic, Nashua, NH (US); Chandra Pandey, Lunenburg, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/456,859

(22) Filed: Aug. 11, 2014

Related U.S. Application Data (63) Continuation of application No. 12/976,130, filed on Dec. 22, 2010, now Pat. No. 8,804,720.

(51) Int. Cl.
    *H04L 12/18* (2006.01)

(52) U.S. Cl.
    CPC .................. *H04L 12/185* (2013.01)

(58) Field of Classification Search
    None
    See application file for complete search history.

(56) References Cited

U.S. PATENT DOCUMENTS

| | | |
|---|---|---|
| 5,818,838 A | 10/1998 | Backes et al. |
| 5,999,530 A | 12/1999 | LeMaire et al. |
| 6,331,983 B1 | 12/2001 | Haggerty et al. |
| 6,970,943 B1 | 11/2005 | Subramanian et al. |
| 6,977,891 B1 | 12/2005 | Ranjan et al. |
| 7,046,680 B1 | 5/2006 | McDysan et al. |
| 7,546,635 B1 | 6/2009 | Krohn et al. |
| 7,653,057 B1 | 1/2010 | Fromm et al. |
| 7,746,799 B2 | 6/2010 | Kokot et al. |
| 7,860,999 B1 | 12/2010 | Subramanian et al. |
| 7,983,205 B1 | 7/2011 | Blease et al. |

(Continued)

OTHER PUBLICATIONS

Wang et al., "IGMP Snooping: A VLAN-Based Multicast Protocol," 5th IEEE International Conference on High Speed Networks and Multimedia communication, Jul. 3, 2002, 6 pp.

(Continued)

*Primary Examiner* — Peter Chau
(74) *Attorney, Agent, or Firm* — Shumaker & Sieffert, P.A.

(57) ABSTRACT

In general, techniques are described for simplifying admission control signaling between subscriber devices, access nodes, and service edge routers to facilitate subscriber-specific admission control for multicast streams. In one example, a service edge router receives a service request and accesses a subscriber profile to determine whether the requesting subscriber is authorized to receive the service. Upon authorization, the service edge router returns the service request to the access node in a substantially similar form in which the service request was received. The access node receives the service request on a service edge router-facing interface, indicating the service edge router has granted authorization for the subscriber device to receive multicast traffic associated with the multicast group identified within the service request. The access node therefore modifies internal mapping tables that determine local elaboration of multicast traffic associated with the multicast group to include an interface to the subscriber device.

18 Claims, 4 Drawing Sheets

(56) References Cited

U.S. PATENT DOCUMENTS

| | | |
|---|---|---|
| 8,345,683 B1 | 1/2013 | Hemige |
| 8,804,720 B1 | 8/2014 | Rainovic et al. |
| 2002/0143951 A1* | 10/2002 | Khan .................. H04L 12/185 709/227 |
| 2002/0186694 A1* | 12/2002 | Mahajan ............. H04L 12/4641 370/390 |
| 2003/0014665 A1 | 1/2003 | Anderson et al. |
| 2003/0145102 A1 | 7/2003 | Keller-Tuberg |
| 2004/0090970 A1 | 5/2004 | Sanchez et al. |
| 2004/0131079 A1 | 7/2004 | Hegde et al. |
| 2004/0258003 A1 | 12/2004 | Kokot et al. |
| 2004/0264443 A1* | 12/2004 | Beck ...................... H04L 63/08 370/352 |
| 2005/0152370 A1 | 7/2005 | Meehan et al. |
| 2006/0126668 A1* | 6/2006 | Kwon ................... H04H 20/82 370/486 |
| 2006/0182109 A1* | 8/2006 | Melsen ................ H04L 12/185 370/390 |
| 2007/0286137 A1* | 12/2007 | Narasimhan .......... H04L 12/185 370/338 |
| 2008/0095062 A1 | 4/2008 | Shankar et al. |
| 2009/0059935 A1* | 3/2009 | Dec ....................... H04L 12/185 370/401 |
| 2009/0279701 A1 | 11/2009 | Moisand et al. |
| 2010/0043067 A1 | 2/2010 | Varadhan et al. |
| 2010/0098086 A1 | 4/2010 | Fromm et al. |
| 2010/0265947 A1 | 10/2010 | Kokot et al. |
| 2012/0039235 A1 | 2/2012 | Chen et al. |
| 2012/0102188 A1* | 4/2012 | Shah ..................... H04L 12/185 709/224 |

OTHER PUBLICATIONS

Prosecution History from U.S. Appl. No. 12/976,130, dated Apr. 24, 2013 through May 9, 2014, 133 pp.

* cited by examiner

PASS-THROUGH MULTICAST ADMISSION CONTROL SIGNALING

CROSS REFERENCE TO RELATED APPLICATIONS

This application is a continuation of U.S. application Ser. No. 12/976,130, filed Dec. 22, 2010, the entire content of which is incorporated herein by reference.

TECHNICAL FIELD

The invention relates to computer networks and, more particularly, to provision of multimedia subscriber services within a computer network.

BACKGROUND

Network Service Providers (NSPs) provide multimedia services to subscribers via subscriber devices and routers of service provider networks maintained by the NSPs. Routers of service provider networks operate within the third layer, i.e., the network layer, of the Open Systems Interconnection (OSI) reference model, and typically communicate with each other using layer three protocols. As a result, routers are often referred to as network layer devices or layer three devices. Similarly, the functionality provided by routers that facilitates provision of Internet services is often referred to as network layer functionality. The routers maintained by NSPs and used by NSPs to provide multimedia services may be referred to as Service Edge (SE) routers. NSPs may use SE routers to provide multimedia services that are differentiated on a per-subscriber basis. Enterprise administrators provide similar services in the context of an enterprise network, such as business campus network or a university campus network.

For example, an NSP or enterprise administrator may allow subscribers to receive multicast streams on associated, respective subscriber devices, also referred to as customer premises equipment (CPE). In order to allow a subscriber device to receive multicast streams, SE routers process requests for the multicast streams, e.g., Internet Group Management Protocol (IGMP) host membership reports, issued by the subscriber device. To provide requested multicast streams, the SE routers or a downstream layer two network device typically replicates and forwards packets of a multicast stream for each subscriber device that has requested the multicast stream. Replication of multicast streams on a per-subscriber basis consumes significant processing and memory resources of the routers, as well as bandwidth on the outbound network links from the routers.

In one traffic delivery model, an NSP or enterprise administrator establishes one or more access nodes between the subscriber devices and the SE routers to aggregate upstream network traffic from multiple subscriber devices and disaggregate downstream network traffic to the subscriber devices. For example, multiple subscriber devices may connect to an SE router via a multiservice access node (MSAN), e.g., a digital subscriber line access multiplexer (DSLAM) or an Ethernet switch, maintained by the NSP or enterprise administrator. Although data for the multiple subscriber devices connected to the switch are transported over the same physical connection between the MSAN and the SE router, each of the subscriber devices has a dedicated subscriber interface, i.e., virtual connection, to the router and hence the Internet.

In addition, the NSP or enterprise administrator may establish respective customer-specific Virtual Local Area Networks (VLANs), or CVLANs, between subscriber devices and SE routers to transport unicast traffic to individual subscribers, as well as a multicast VLAN, or MVLAN, to transport multicast traffic to all subscribers. To receive multicast traffic associated with a multicast group, e.g., an Internet Protocol television (IPTV) channel, a subscriber device issues a membership request, e.g., an Internet Group Management Protocol (IGMP) multicast group membership request, for the multicast group on its respective CVLAN to the SE router. The MSAN, which is positioned between the subscriber device and the SE router, forwards the request to the SE router on the CVLAN for the subscriber device. In addition to forwarding the membership request, the MSAN snoops the content of the membership request as it is communicated to the SE router and determines the particular multicast group requested by the subscriber device, and maps the multicast group to a CVLAN interface for the subscriber device. Thereafter, as the MSAN receives multicast traffic from the SE router on the MVLAN, the MSAN locally elaborates multicast traffic for the multicast group to the customer-facing CVLAN interfaces for output to the subscriber devices. In this way, the MSAN elaborates individual multicast streams only to CVLANs for subscriber devices that have requested the multicast streams.

In such system, the intermediate MSAN typically has no information as to which multicast groups a subscriber device is permitted to request and ultimately receive. As such, some system have utilized admission control signaling protocols by which the SE router signals the MSAN as to which groups may be provisioned to each subscriber devices and, therefore, which subscriber-originated requests should be snooped and processed. For example, conventional techniques for performing admission control signaling involve implementing an access node configuration protocol, such as the Access Node Control Protocol (ANCP) or Layer Two Control Protocol (L2CP). Execution of these additional signaling protocols on the devices, however, adds significant complexity to the access node or subscriber devices.

SUMMARY

In general, techniques are described for simplifying admission control signaling between subscriber devices, access nodes, and service edge routers to facilitate subscriber-specific admission control for multicast streams transported over an MVLAN and one or more CVLANs. Various subscribers may have access to differentiated services and/or a specific bandwidth allocation based upon, for example, the service package to which each subscriber has subscribed. In one example, an access node receives a request, issued by a subscriber device, for a service on a CVLAN interface of the access node. The access node forwards the service request upstream to a service edge router for the subscriber device.

The service edge router receives the service request on a CVLAN interface and accesses a subscriber profile to determine whether the subscriber is authorized to receive the service. Upon authorizing a subscriber device, the service edge router returns the service request to the access node over the CVLAN in a substantially similar form in which the service request was received. As such, the access node subsequently receives the same service request, but this time on a service edge router-facing interface of the CVLAN. The access node is configured to treat the reception as an implicit indication that the service edge router has granted authorization for the subscriber device, identified by a source MAC address for the service request, to receive multicast traffic associated with the particular multicast group identified within the service request. The access node therefore modifies internal mapping tables that determine local elaboration of multicast traffic associated with the multicast group to include a CVLAN interface for the subscriber device.

In other words, whereas the access node earlier forwarded the upstream service request unmolested and without modifying mapping tables for elaborating multicast traffic received in an MVLAN to CVLANs for subscriber devices, a substantially similar downstream service request hairpinned at the service edge router indicates to the access node that the subscriber device is properly authorized to receive the requested service.

The techniques of this disclosure may provide one or more advantages. For example, conventional techniques for performing admission control signaling involve implementing an access node configuration protocol, such as the Access Node Control Protocol (ANCP) or Layer Two Control Protocol (L2CP), which adds significant complexity to the access node or subscriber devices. The described techniques may avoid implementation of a separate signaling protocol by instead basing admission control at the access node upon the identity of an interface at which a service request is received. The techniques may thus significantly reduce configuration complexity at an access node with minimal changes to the manner in which service request snooping and authorization is performed by the access node and service edge router. The techniques may also enable admission control signaling in instances where subscriber devices do not have admission control signaling capabilities, thereby extending subscriber manageability to additional network architectures that employ a CVLAN and MVLAN multicast delivery model.

In one embodiment, the invention is directed to a method comprising receiving, with a network device connected to a downstream subscriber device via a layer two (L2) communication link, a first multicast service signaling message with a first network interface of the network device, wherein the first network interface of the network device is connected via a communication link to an upstream services router, wherein the first multicast service signaling message specifies a multicast group. The method further comprises determining the first multicast service signaling message carries layer three (L3) multicast service signaling information. The method also comprises filtering, with a data plane of the network device, the first multicast service signaling message to a control plane of the network device based at least on the determination that the first multicast service signaling message carries L3 multicast service signaling information and on a first identifier for the first network interface at which the first multicast service signaling message was received. The method further comprises modifying, with the control plane of the network device, multicast filter information in the data plane of the network device in accordance with the L3 multicast service signaling information to affect replication and forwarding, to the subscriber device, by the data plane of multicast traffic associated with the multicast group.

In another embodiment, the invention is directed to a method comprising receiving a first multicast join request with a services router connected to a network device situated between the services router and a subscriber device, wherein the first multicast join request specifies a requested multicast group and authorizing, with the services router, a subscriber associated with the subscriber device to receive multicast traffic associated with the requested multicast group. The method further comprises the step of, only when the subscriber is authorized to receive multicast traffic associated with the requested multicast group, outputting the first multicast join request toward the subscriber device.

In another embodiment, the invention is directed to a network device situated between an upstream services router and a subscriber device, the network device comprising a control unit having a control plane and a data plane. The network device also comprises multicast filter information that specifies one or more multicast groups for which the subscriber device is a receiver, and a first network interface, connected to the upstream services router via a layer two (L2) communication link, that receives a first multicast service signaling message that specifies a multicast group, wherein the data plane determines the first multicast service signaling message carries layer three (L3) multicast service signaling information. The network device additionally comprises a second network interface connected to the subscriber device via an L2 communication link, and a filter that causes the data plane to filter the first multicast service signaling message to the control plane based at least on the determination that the first multicast service signaling message carries L3 multicast service signaling information and on a first identifier for the first network interface. The network device further comprises a multicast filtering module of the control plane that modifies the multicast filter information to alter replication and forwarding, to the subscriber device via the second network interface, by the data plane of multicast traffic associated with the multicast group.

In another embodiment, the invention is directed to a services router connected to a network device situated between the services router and a subscriber device, the services router comprising a service request handler that receives a first multicast join request, wherein the first multicast join request specifies a requested multicast group. The services router also comprises an authorization module that authorizes a subscriber associated with the subscriber device to receive multicast traffic associated with the requested multicast group, wherein the service request handler, only when the authorization module authorizes the subscriber to receive multicast traffic associated with the requested multicast group, outputs the first multicast join request toward the subscriber device.

In another embodiment, the invention is directed to a computer-readable medium containing instructions. The instructions cause a programmable processor to receive, with a network device connected to a subscriber device via a layer two (L2) communication link, a first multicast service signaling message with a first network interface of the network device, wherein the first network interface is connected via a communication link to an upstream services router, wherein the first multicast service signaling message specifies a multicast group. The instructions also cause the programmable processor to determine, with a data plane of the network device, the first multicast service signaling message carries layer three (L3) multicast service signaling information. The instructions also cause the programmable processor to filter, with the data plane of the network device, the first multicast service signaling message to a control plane of the network device based at least on the determination that the first multicast service signaling message carries L3 multicast service signaling information and on a first identifier for the first network interface at which the first multicast service signaling message was received. The instructions also cause the programmable processor to modify, with the control plane of the network device, multicast filter information in the data plane of the network device to affect replication and forwarding, to the subscriber device, by the data plane of multicast traffic associated with the multicast group.

In another embodiment, the invention is directed to a method comprising forwarding multicast signaling messages from a subscriber device to an upstream services router with an intermediate layer two (L2) device without snooping on the multicast signaling messages when the multicast signaling messages from the subscriber device are received on a network interface that connects the intermediate device to the subscriber device. The method further comprises snooping on the multicast signaling messages with the intermediate device when the multicast signaling messages from the subscriber device are received on a network interface that connects the intermediate device to the upstream services router. The method also comprises controlling distribution of multicast data from the intermediate network device to the subscriber device in accordance with the snooped multicast signaling messages.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
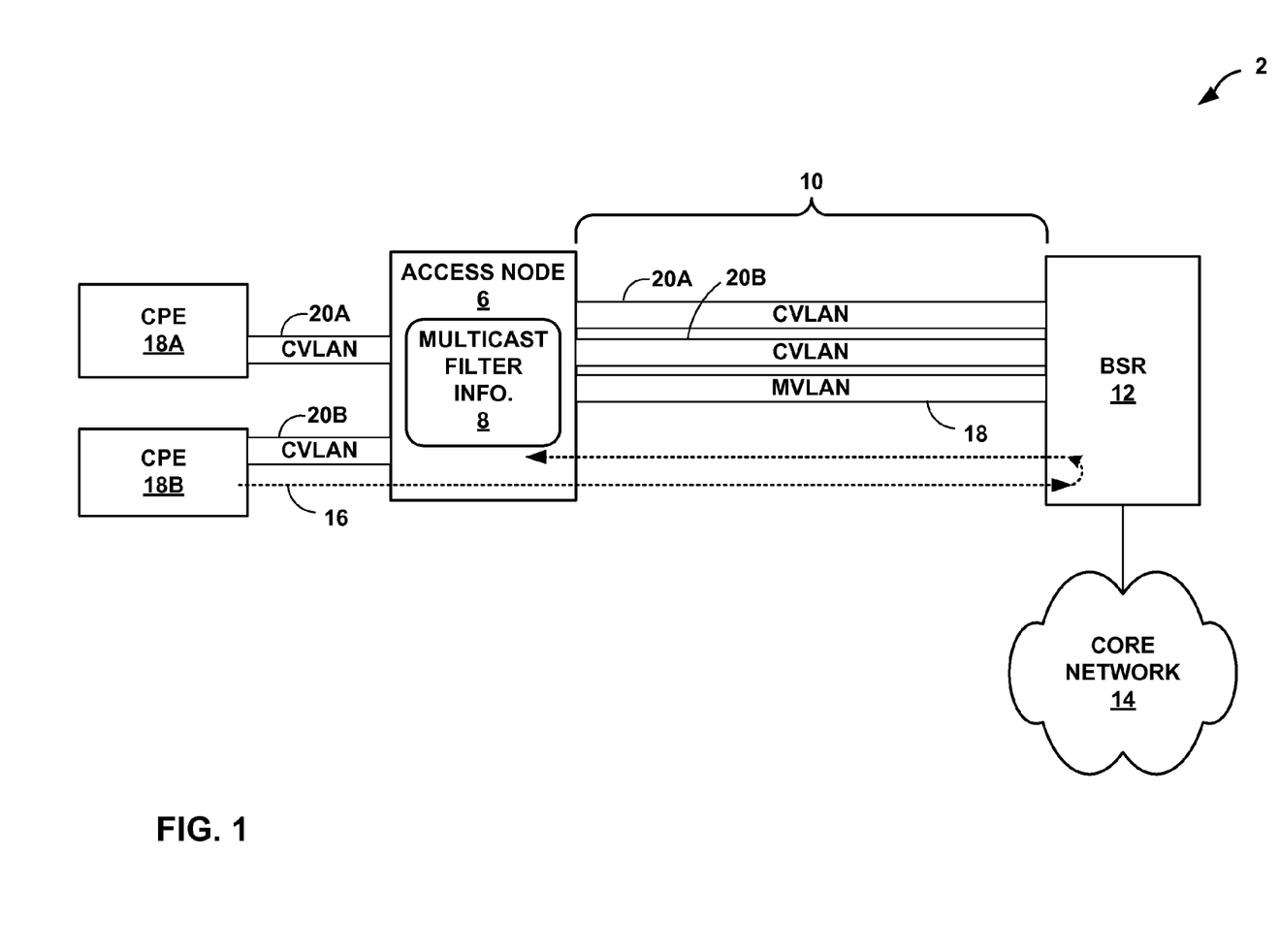
FIG. 1 is a block diagram illustrating an example network system in which an access node and a broadband services router perform admission control signaling in accordance with the described techniques

FIG. 1 is a block diagram illustrating an example network system 2 in which an access node 6 locally elaborates multicast traffic received on a multicast virtual local area network (MVLAN) 18 to one or more customer premises equipment 18A-18B ("CPE 18") over respective customer VLANs (CVLANs) 20A-20B due to admission control signaling performed by access node 6 and broadband services router 12 ("BSR 12") in accordance with the described techniques. Broadband services router 12 is an edge router delivers services transported over core network 14 to authorized subscriber associated subscriber devices connected to BSR 12 via access network 10 and access node 6. Services delivered may include, for example, Voice over Internet Protocol (VoIP), Video on Demand (VoD) and/or IP television (IPTV), gaming and business services, Internet access, virtual private networking (VPN) services, and interactive multimedia. Broadband services router 12 provides subscriber management for subscribers associated with respective CPE 18, which may include accounting, authorization, and authentication (AAA) functionality performed internally or in conjunction with external servers (e.g., a Remote Authentication Dial-In User Service) (not shown). That is, BSR 12 comprises or otherwise access subscriber profiles that each determine multicast access to core network 14, class of service (CoS), allocated bandwidth, and other service properties for an associated subscriber.

Broadband services router 12 is a network layer device according to the OSI reference model and may alternatively be referred to as a service edge router. In some embodiments, BSR 12 may comprise a router that maintains routing information between CPE 18 and core network 14. Broadband services router 12 may comprise, for example, a Broadband Network Gateway (BNG) or a Broadband Remote Access Server (BRAS) to aggregate traffic from multiple access nodes, including access node 6, for delivery to core network 4. In some embodiments, BSR 12 comprises a network access server (NAS).

Access node 6 of network system 2 aggregates layer two (L2) traffic for CPE 18 for delivery over access network 10 to BSR 12. Access node 6 may represent a multiservice access node (MSAN), such as a digital subscriber line access multiplexer (DSLAM) or an optical line terminal (OLT). In some embodiments, access node 6 represents a Cable Modem Termination System (CMTS) or an L2 switch, such as an Ethernet or Asynchronous Transfer Mode (ATM) switch. In still further embodiments, access node 6 comprises a wireless base station or wireless access point for a wireless content access network (IP-CAN), WiFi network, or WiMax network. Access network 10 supports an L2 protocol and may comprise, for example, an optical delivery network (ODN) or an ATM or Ethernet network.

Subscribers utilize CPE 18 to exchange L2 packets with access node 6 over, for example, a passive optical network (PON) such as a Gigabit PON (GPON) or Gigabit Ethernet PON (GEPON), one or more DSL lines, Ethernet over twisted pair, coaxial cables, power lines, a WiFi, 3G, WiMax, or other suitable wireless or wireline medium. Each of CPE 18 may comprise a DSL or cable modem, a wireless phone, a video conferencing device, a gaming console, an IP television or television set top box, for instance.

Each of CPE 18 may utilize the Point-to-Point protocol (PPP) to communicate with access node 6. Specifically, using PPP, one of CPE 18 requests access to core network 14 and provides user information, such as a username and password. PPP may be supported on digital subscriber lines (DSLs) that connect CPE 18 with access node 6. In other embodiments, CPE 18 may use a non-PPP protocol to communicate with access node 6. BSR 12 attaches CPE 18 upon authenticating each of CPE 18 using provided user information.

A network service provider or enterprise administrator that administers BSR 12 and access node 6 establishes a subscriber-dedicated one of CVLANs 20A-20B for CPE 18A-18B, respectively. Each of CVLANs 20 carry subscriber-specific unicast traffic to the respective CPE 18. For example, CVLAN 20A may carry VoIP traffic for CPE 18A that is not delivered to or otherwise accessible to CPE 18B. By establishing a CVLAN for each of the CPE, BSR 12 is able to manage bandwidth on a per-subscriber basis and perform subscriber-based call admission control for services.

Access node 6 is configured to include VLAN mapping information that maps L2 interfaces (e.g., Ethernet interfaces) to one of CVLANs 20 based on, for example, a Media Access Control (MAC) address for one of CPEs 18 or BSR 12, user information received during CPE attachment to BSR 12, or a static port-based VLAN configuration. Access node 6 forwards L2 frames (e.g., Ethernet frames) that carry a VLAN tag for one of the CVLANs to any other L2 interfaces of access node 6 mapped to the CVLAN. In some embodiments, access node 6 tags/strips VLAN tags of L2 frames exchanged between CPE 18 and BSR 12. For example, access node 6 may remove VLAN tags corresponding to CVLAN 20A from L2 frames received from BSR 12 prior to forwarding the L2 frames to CPE 18A. For each of CVLANs 20, access node 6 includes a respective CPE 18-facing and a BSR 12-facing interface. Access node 6 associates each CVLAN interface with an internal identifier, which may include an IP-address, a logical interface identifiers (e.g., "vlan.0" or "vlan.14"), a VLAN ID (e.g., "v10"), a physical interface (e.g., "ge-0/0/1"), or a combination of such identifiers.

In addition to subscriber-specific CVLANs 20, the network service provider or enterprise administrator configures access node 6 and BSR 12 to implement multicast VLAN 18 ("MVLAN 18"), a service VLAN (SVLAN) that carries services-related traffic, such as multicast streams associated with one or more multicast groups. Multicast streams may include, for example, video, audio, data, voice, or any combination thereof. BSR 12 tags services-related traffic, received from core network 14 and destined for either of CPE 18, with a VLAN tag for MVLAN 18 and forwards the traffic to access node 6 via access network 10. In some embodiments, communication between BSR 12, access node 6, and CPE 18 may be via Asynchronous Transfer Mode (ATM) Virtual Circuits (VCs), or a combination of ATM VCs and VLANs.

Access node 6 includes multicast filter information 8 ("multicast filter info. 8") that determines local elaboration of various multicast streams by the access node to CPE 18. Multicast filter information 8 include entries that each map a multicast group identifying a multicast stream to one or more CPE 18. On receiving multicast traffic on MVLAN 18, access node 6 identifies outbound interfaces for one or more of CPE 18 mapped to a multicast group for the multicast traffic in multicast filter information 8 and outputs the multicast traffic to each of the identified outbound interfaces. In this way, access node 6 replicates and forwards multicast traffic for various multicast groups to requesting CPE 18.

Access node 6 is a layer three (L3) aware or an L3 device that can intercept and interpret service signaling messages issued between CPEs 18 and BSR 12. Service signaling messages may include multicast service signaling messages, such as an Internet Group Management Protocol (IGMP) multicast group membership request issued by one of CPE 18 or an IGMP group leave request. The term "issued," and variants thereof as used herein, refers to originating message content rather than merely sending, forwarding, returning, or hair-pinning message content, for example. In accordance with the techniques of this disclosure, access node 6 intercepts upstream service request 16 issued on CVLAN 20B by CPE 18B and passes through, i.e., forwards without L3 inspection, service request 16 to BSR 12 on CVLAN 20B. In the example of FIG. 1, access node 6 does not intercept and snoop on upstream service request 16 as it flows from CPE 18B to BSR 12 but instead switches or routes the service request in normal fashion.

BSR 12 receives service request 16 forwarded by access node 6 and determines whether to authorize the service for CPE 18B. If CPE 18B is authorized to receive the requested content or otherwise join the specified multicast group, BSR 12 redirects service request 16 back downstream to access node 6. By returning service request 16 to access node 6 over CVLAN 20B, BSR 12 implicitly indicates authorization for CPE 18B to the access node for the requested service. In instances where the service request is an IGMP multicast group membership request, returning the service request to access node 6 indicates BSR 12 has authorized membership for CPE 18B in the requested multicast group. In instances where BSR 12 denies authorization, the BSR may simply drop the service request. In some embodiments, however, BSR 12 issues a service denied message to access node 6 in response to service request 16 to indicate that BSR 12 has affirmatively considered service request 16.

Access node 6 receives service request 16 from BSR 12 on a BSR 12-facing interface of the respective one of CVLANs 20 for the requesting CPE 18. In this case, even though the request is received on the BSR-facing interface, the L2 source address for the request may remain an L2 address of CPE device 18B, as when originally output by CPE 18B. Because service request 16 arrived on a BSR 12-facing interface, access node 6 does not merely forward the service request but instead snoops the service request to process service request information contained therein. Specifically, access node 6 determines the service requested and installs or modifies an entry within multicast filter information 8 to map an identifier for the CPE 18B-facing interface for CVLAN 20B to a multicast group identifier for the requested service, such as a multicast group address or a multicast source address-group address pair that includes a multicast source and multicast group address. The modified multicast filter information 8 directs access node 8, upon subsequently receiving service traffic associated with the requested service identified in service request 16 on MVLAN 18, to replicate and forward the service traffic to CPE 18B over CVLAN 20B. In some instances, access node 6 determines the service requested and installs or modifies an entry within multicast filter information 8 to map the L2 source address for CPE 18B, rather than the CPE 18B-facing interface for CVLAN 20B, to a multicast group identifier.

The described admission control techniques may circumvent the need for an explicit call admission control protocol implementation within CPEs 18, access node 6, and/or BSR 12 by instead basing admission control at access node 6 upon the specific interface at which a service request is received. The techniques may thus significantly reduce configuration complexity at access node 6 with minimal changes to the manner in which service request snooping and authorization is performed by access node 6 and BSR 12. This may permit reduced capital outlays for access nodes throughout a service provider or enterprise network. The techniques may also enable admission control signaling in instances where CPE 18 do not have admission control signaling capabilities, thereby extending subscriber manageability to additional network architectures that employ a CVLAN and MVLAN service delivery model.

Figure 2:
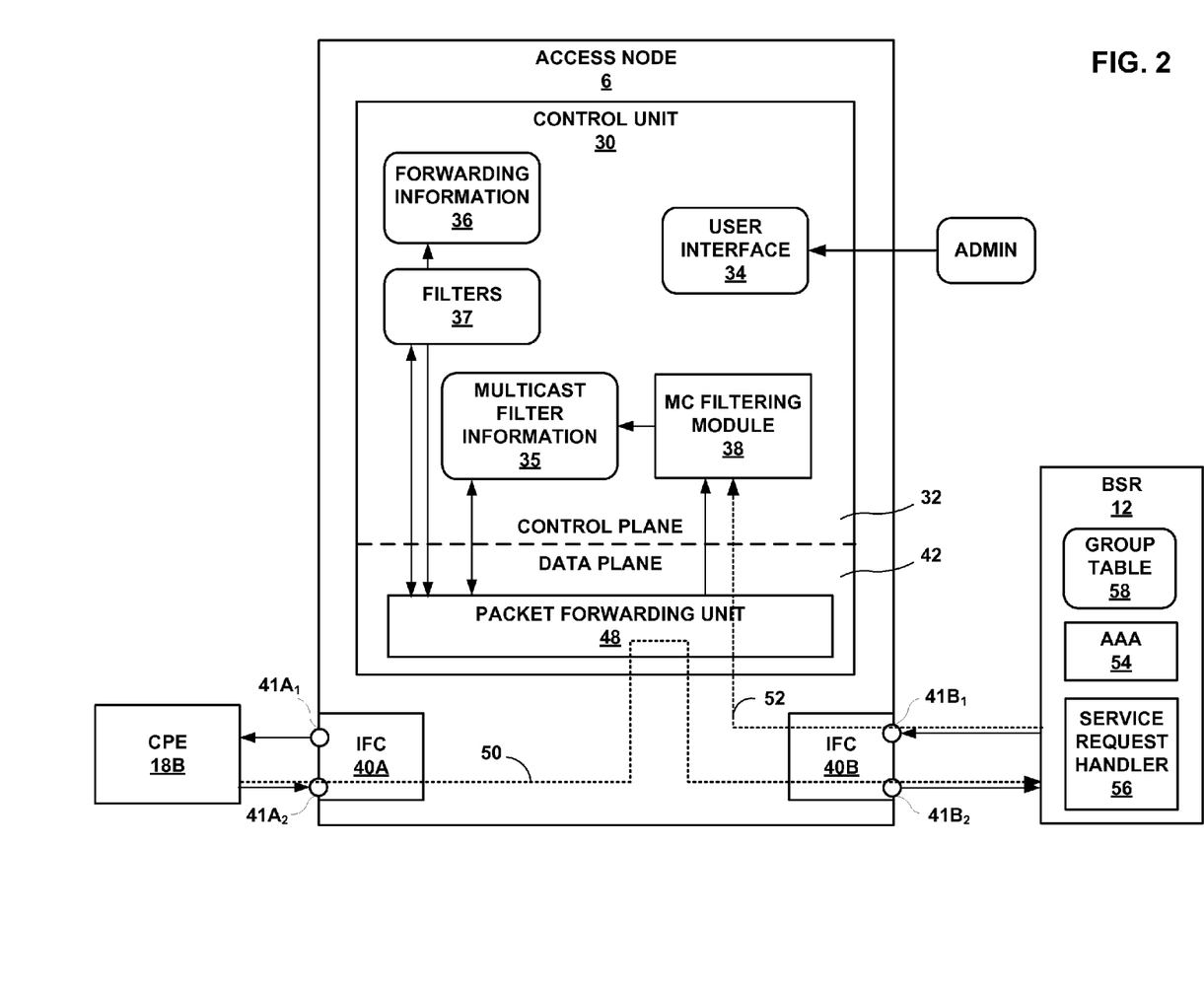
FIG. 2 is a block diagram illustrating an access node and a broadband services router that control filtering of multicast streams using interface-determinative control plane inspection techniques that accord with one embodiment of the invention.

FIG. 2 is a block diagram illustrating an example access node 6 and an example BSR 12 that control filtering of multicast streams using interface-determinative control plane inspection techniques that accord with one embodiment of the invention. Access node 6 may be, for example, a DSLAM, CMTS, or Ethernet bridge, as described above. Access node 6 includes interface cards 40A-40B ("IFCs 40"). Interface card 40A includes interfaces $41A_1$, $41A_2$ that send and receive, respectively, flows of ATM cells or Ethernet frames via communication links to CPE 18B. Interface card 40B includes interfaces $41B_1$, $41B_2$ that receive and send, respectively, flows of L2 communications (such as ATM cells or Ethernet frames) via communication links to BSR 12. In some embodiments, interfaces $41A_1$, $41A_2$ may be collectively implemented as a bidirectional interface and interfaces $41B_1$, $41B_2$ may also be collectively implemented as a bidirectional interface. In various embodiments, access node 6 may comprise more or fewer interface cards and respective interfaces.

Access node 6 is logically represented as being separated into a control plane 32 (i.e., the hardware and software components that provide an operating environment for communication with other network devices) and a data plane 42 (i.e., the hardware and software components handling data forwarding). Control unit 30 of access node 6 provides an operating environment for control plane 32 and data plane 42 components and may include one or more processors or controllers (not shown in FIG. 2) that execute software instructions, such as those used to define a software or computer program, stored to a tangible computer-readable medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 30 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware.

Forwarding information 36 and filters 37 direct operation of packet forwarding unit 48 for handling inbound L2 communications received at IFCs 40. Specifically, packet forwarding unit 48 replicates and forwards L2 communications between interfaces of IFCs 40 in accordance with forwarding entries of forwarding information 36. In the illustrated embodiment, forwarding information 36 maps each of interfaces 41A, 41B to a CVLAN for CPE 18B. In this way, L2 communications received on an interface mapped to the CVLAN are forwarded to the other interfaces mapped to the CVLAN. In accordance with the techniques of this disclosure, MAC or other L2 learning may be disabled on the CVLAN to enable BSR 12 to spoof CPE 18B in L2 communications without disrupting L2 forwarding by access node 6 with respect to the CVLAN. Because only two devices, BSR 12 and CPE 18B, are present on the CVLAN, disabling MAC address learning does not result in port mappings that are inconsistent with the CVLAN topology. Forwarding information 36 may comprise a MAC address table that includes a mapping of MAC addresses to interfaces 41 and/or to VLAN IDs that identify one or more VLANs mapped to interfaces 41.

In addition, packet forwarding unit 48 filters, in accordance with filters 37, a subset of L2 communications received at IFCs 40 to redirect the L2 communications to control plane 32 for processing by multicast filtering module 38. Although illustrated within control plane 32, control unit 30 may install forwarding information 36 and filters 37, or a subset of the forwarding entries and filters thereof, to packet forwarding unit 48. Packet forwarding unit 48 may comprise multiple packet-forwarding engines (PFEs), where each of the PFEs may have multiple processors and multiple physical interface cards, such as IFCs 40.

In accordance with the described techniques, an administrator or a software agent or thread configures forwarding information 36 via user interface 34 to include forwarding entries to cause packet forwarding unit 48 to forward multicast messages, e.g., IGMP host membership reports requesting membership in a multicast group associated with a requested multicast stream or IGMP leave group messages, to upstream BSR 12. In the illustrated example, a configured forwarding entry includes an identifier for inbound interface $41A_2$ of IFC 40A that receives L2 communications from CPE 18B and an identifier for outbound interface $41B_2$ that sends L2 communications to BSR 12.

In addition, an administrator or a software agent additionally configures filters 37 to include a filter to cause packet forwarding unit 48 to send multicast messages received from BSR 12 to control plane 32, specifically, to multicast filtering module 38. The included filter may identify inbound interface $41B_1$ and include information that identifies one or more L2 communications as including L3 multicast communications. For example, the included filter may cause packet forwarding unit 48 to filter (that is, send to control plane 32) L3 communications that have an L3 header with a protocol field that identifies IGMP as the next level protocol and that are encapsulated in an L2 packet received on interface $41B_1$, the BSR 12-facing interface for the CVLAN for CPE 18B.

Identifiers for interfaces 41A, 41B of IFCs 40 may comprise an interface name. In one example format, an interface name is represented by a physical part and a logical part in the following format: physical.logical. The physical part of the interface name identifies the physical device corresponding to a single physical network interface connector, or port. The physical part has the following format: type-card/pic/port, where type identifies the interface type such as SONET ("so") or GigE ("ge"), card refers to an index or other identifier of a PFE, pic refers to a physical interface card, i.e., one of IFCs 40, and port indexes a particular interface connection on the referenced physical interface card, such as interfaces 41A, 41B. According to one example, the interface name for interface $41B_1$ is ge-1/0/0.0.

In this example, CPE 18B issues multicast join message 50 to BSR 12 requesting membership in a multicast group. That is, multicast join message 50 may, for example, be an IGMP join message having a source MAC address of CPE 18B and a destination network address of a requested multicast group. Access node 6 receives multicast join message 50 at inbound interface $41A_2$ and forwards the message, in accordance with forwarding information 36, via outbound interface $41B_2$. Access node 6 need not, in contradistinction to conventional IGMP snooping schemes, snoop upstream multicast join message 50 and responsively modify multicast filter information 35 at this time to include CPE 18B as a recipient of multicast traffic associated with the multicast group identified in the join message. In some embodiments, access node 6 may execute IGMP in control unit 30 for processing IGMP messages once snooped.

Service request handler 56 of BSR 12 receives IGMP messages issued by CPE 18 that indicate a desire to join or leave multicast groups, i.e., to receive or stop receiving multicast streams. In the case of multicast join messages, service request handler 56 determines whether to authorize membership in a requested multicast group based on, for example, a service profile for the subscriber associated with the requesting CPE 18. Service request handler 56 requests service profiles for subscribers from AAA module 54 of BSR 12. AAA module 54 may comprise an AAA client that communicates with an AAA server, e.g., a RADIUS or Diameter server, to authenticate subscribers and obtain service profiles for subscribers or authorize subscribers for requested services. In some embodiments, AAA module 54 stores service profiles for associated subscribers.

Each service profile may include, for example, one or more Quality of Service (QoS) classes for packets originating from or destined for the associated CPE 18. A QoS class may define a bandwidth allocation and burst size to support a level of communication throughput for CPE 18 within that QoS class. Each service profile may also include a list of identifiers for authorized services for the associated subscriber. Identifiers for authorized services, in the multicast context, may include a multicast group identifier such as a multicast group address or a multicast source address-group address [i.e., (S,G) or (*,G)] pair. AAA module 54 may therefore authorize a multicast join message by identifying from the message the multicast group in which membership is requested and comparing the multicast group to the list of authorized services in the service profile for the subscriber associated with the requesting one of CPE 18.

In the illustrated embodiment, service handler 56 of BSR 12 receives IGMP join message 50 forwarded by access node 6 and, in conjunction with AAA module, authorizes the request for the subscriber associated with CPE 18B. In accordance with the described techniques, service request handler 56 returns upstream multicast join message 50 toward CPE 18B as downstream multicast join message 52. Multicast join messages 50, 52 are substantially similar including, for example, identical VLAN identifiers for CVLAN 20B and identical IGMP-related information within an encapsulated L3 packet. Multicast join message 50, 52 may in some instances also include identical MAC addresses (that is, the MAC address of CPE 18B). In this respect, BSR 12 spoofs CPE 18B by using the MAC address for CPE 18B as a source MAC address for multicast join message 52.

Upon receiving multicast join message 52 at interface 41B₁, packet forwarding unit 48 inspects the message and, as directed by filters 37, determines the message is an IGMP message. Packet forwarding unit 48 therefore sends the message to multicast filtering module 38 ("MC filtering module 38") for analysis. In this way, access node 6 may have IGMP snooping enabled for only upstream-facing interfaces, and intercepts multicast join message 52 to analyze the IGMP-related information therein.

Multicast filtering module 38 analyzes the content of IGMP communications to build and modify multicast filter information 35, a cache table or other associative data structure having entries that each map a multicast group to interfaces for CPE that are receivers of multicast traffic associated with the multicast group. Multicast filter information 35 describes how received multicast packets, or more particularly the L2 frames or cells containing such multicast packets, should be replicated and forwarded to one or more of CPE 18. Multicast filter information 35 may be installed in whole or in part to packet forwarding unit 48.

Upon receiving multicast join message 52, multicast filtering module 38 identifies the multicast group in which membership is requested and additionally identifies the one of CVLANs 20 (that is, CVLAN 20B) on which the message was received by, for examining the VLAN tag of multicast join message 52. Multicast filtering module 38 adds or modifies an entry of multicast filter information 35 to specify that the CPE 18B-facing interface of CVLAN 20B is to receive multicast traffic for the identified multicast group for forwarding toward CPE 18B. Access node 6 does not forward the multicast join message 52 to CPE 18B. In some embodiments, multicast filtering module 38 maps an identifier for outbound interface 41A₁, connected to CPE 18B, to an entry in multicast filter information 35 for the identified multicast group.

Because filters 37 cause packet forwarding unit 48 to filter only downstream IGMP communications to multicast filtering module 38, the IGMP communications analyzed by multicast filtering module 38 are assured a result of authorization/deauthorization or other call admission control operations of BSR 12 that is responsible for subscriber and network management. As a result, BSR 12 may ensure that a subscriber has a desired Quality of Experience (QoE) level by ensuring that adequate network resources are available for a requested service. This may allow the subscriber associated with CPE 18B to avoid, for example, VoD drops due to network congestion by other multicast streams.

As access node 6 receives multicast traffic from BSR 12, packet forwarding unit 48 replicates and forwards (i.e., elaborates) the multicast traffic as directed by multicast filter information 35 generated by multicast filtering module 38 in accordance with the described techniques. In one example, access node 6 receives multicast traffic on an MVLAN and replicates and forwards the multicast traffic to CPE 18B on a CVLAN for CPE 18B.

CPE 18B may also issue multicast leave messages, such as an IGMPv2 leave group message, to request to stop receiving multicast traffic for a specified multicast group. Forwarding information 36 is configured to direct packet forwarding unit 48 to forward multicast leave messages to BSR 12, which hair-pins the message to access node 6, where the returned message is substantially similar to the issued message. Packet forwarding unit 48, as directed by filters 37, filters downstream multicast leave messages to multicast filtering module 38, which removes CPE 18B from the multicast filter information 36 entries for the multicast groups specified in the multicast leave messages.

In some instances, BSR 12 may eliminate service to CPE 18B for a particular multicast stream due to, for example, network congestion or a change to the service profile for the subscriber associated with CPE 18B. In accordance with the techniques described, BSR 12 also maintains multicast group table 58, an associative data structure that maps MAC addresses for CPE served by BSR 12 to one or more multicast groups authorized for the CPE. To eliminate service to CPE 18B for a particular multicast stream, BSR 12 generates a multicast leave message that specifies the multicast group. In addition, BSR 12 may spoof CPE 18B by determining the MAC address for CPE 18B from group table 58 and setting the MAC address as the source MAC address for the generated multicast leave message. BSR 12 sends the multicast leave message toward CPE 18B, which is intercepted by access node 6 by operation of packet forwarding unit 48 applying filters 37. Multicast filtering module 38 determines the source MAC address from the multicast leave message and removes CPE 18B from the specified set, within multicast filter information 35, of subscriber devices that are recipients of the multicast group specified by the multicast leave message. Access node 6 therefore no longer elaborates multicast traffic associated with the multicast group to CPE 18B. In some embodiments, multicast group table 58 maps respective CVLAN or CVLAN interfaces, rather than MAC addresses, for CPE served by BSR 12 to one or more multicast groups authorized for the CPE.

In some embodiments, access node 6 and BSR 12 cooperate to reduce a number of IGMP messages between CPE 18B and BSR 12. In such embodiments, BSR 12 may generate and issue a multicast leave message toward CPE 18B, as described above, in response to denying authorization to a multicast join message issued by CPE 18B. In this case, the multicast leave message is analogous to a "NAK"

message from BSR 12 toward CEP 18B. Access node 6 intercepts the multicast leave message according to the techniques described above and, in addition, multicast filtering module 38 modifies forwarding information 36 to direct packet forwarding unit 48 to drop additional multicast join messages from CPE 18B. As a result, access node 6 relieves BSR 12 of processing repeated IGMP messages from CPE 18B. Multicast filtering module 38 may restore forwarding information 36 to cause forwarding, rather than dropping, of IGMP messages after a set time.

In embodiments where BSR 12 generates and issues a multicast leave message toward CPE 18B in response to denying authorization to a multicast join message issued by CPE 18B, as described above, access node 6 may log forwarded upstream multicast join requests. If access node 6 does not receive a message from BSR 12 responsive to a logged upstream multicast join request after a set time, access node 6 may reissue the multicast join request to BSR 12. In this way, access node 6 operates as an IGMP proxy by resending IGMP messages on behalf of CPE 18B and improves scalability for BSR 12 by enabling responsiveness, from the perspective of CPE 18B, of each issued multicast join request even where BSR 12 may drop an initial multicast join request due to high processing load, for example. In some embodiments, access node 6 additionally monitors IGMP messages issued by CPE 18B and suppresses a number of IGMP messages that exceed a permissible rate. This technique may also improve the scalability of BSR 12 toward handling larger numbers of subscriber devices.

Figure 3:
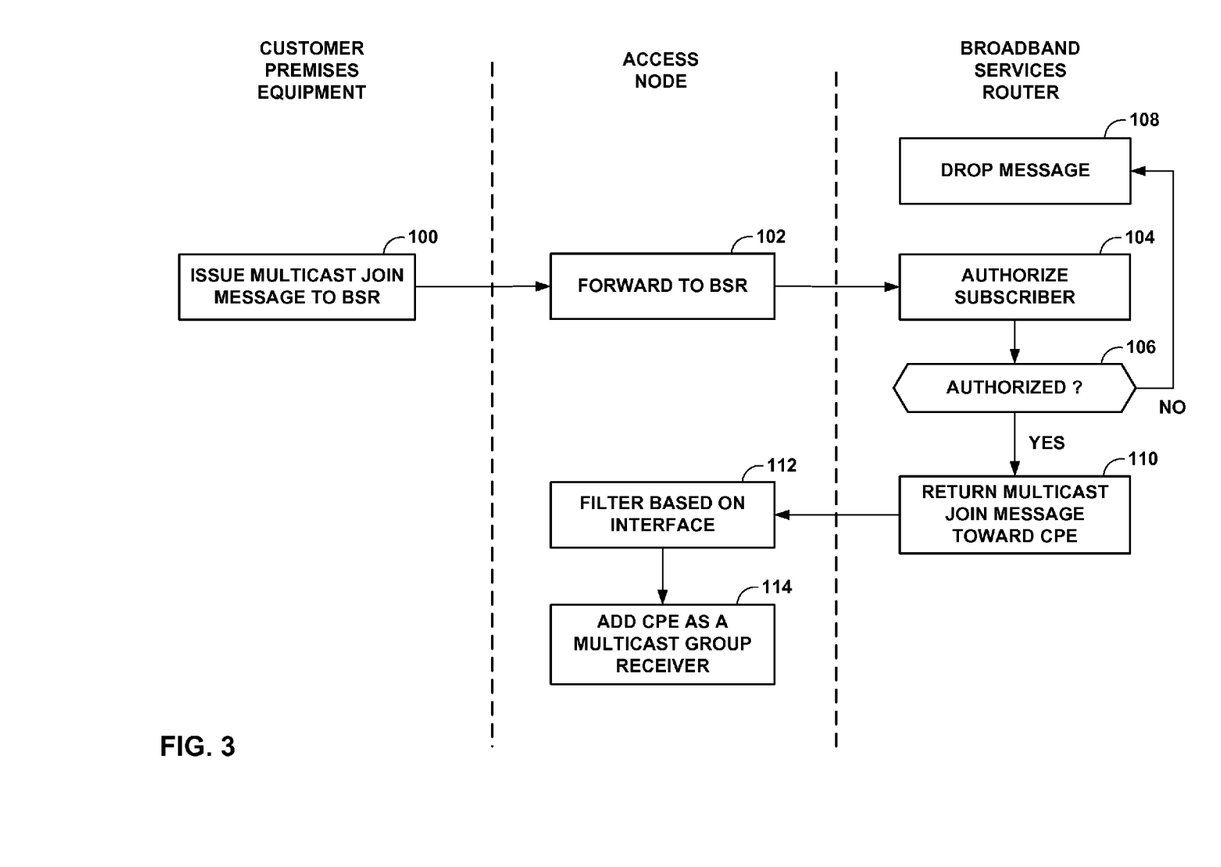
FIG. 3 is a flow chart illustrating an example operation of a customer premises equipment, an access node, and a broadband services router to perform pass-through admission control signaling according to the described techniques.

FIG. 3 is a flow chart illustrating an example operation of CPE 18B, access node 6, and BSR 12 of FIG. 1 to perform pass-through admission control signaling. Customer premises equipment 18B issues a multicast join message, requesting membership in a multicast group, toward BSR 12 (100). Access node 6 receives the multicast join message on a CPE 18B-facing interface and passes the message through by forwarding the message to BSR 12 (102).

BSR 12 receives the multicast join message and determines whether to authorize the subscriber associated with CPE 18B for the multicast group requested in the multicast join message (104). For failed authorizations (NO branch of 106), BSR 12 drops the multicast join message (108). Upon authorizing the subscriber to receive multicast traffic associated with the requested multicast group (YES branch of 106), BSR 12 returns the multicast join message toward CPE 18B in substantially similar form as received by the BSR (110).

Access node 6 receives the returned multicast join message on a BSR 12-facing interface and, based on the receiving interface, access node 6 filters the message to redirect the message to the control plane for analysis as a snooped multicast join message (112). Upon identifying the multicast group specified in the multicast join message, access node 6 adds CPE 18B as a receiver for the multicast group (114). In one example, access node 6 adds CPE 18B as a receiver by mapping a CPE 18B-facing interface, such as the CPE 18B-facing interface of CVLAN 20B, to the multicast group address.

Figure 4:
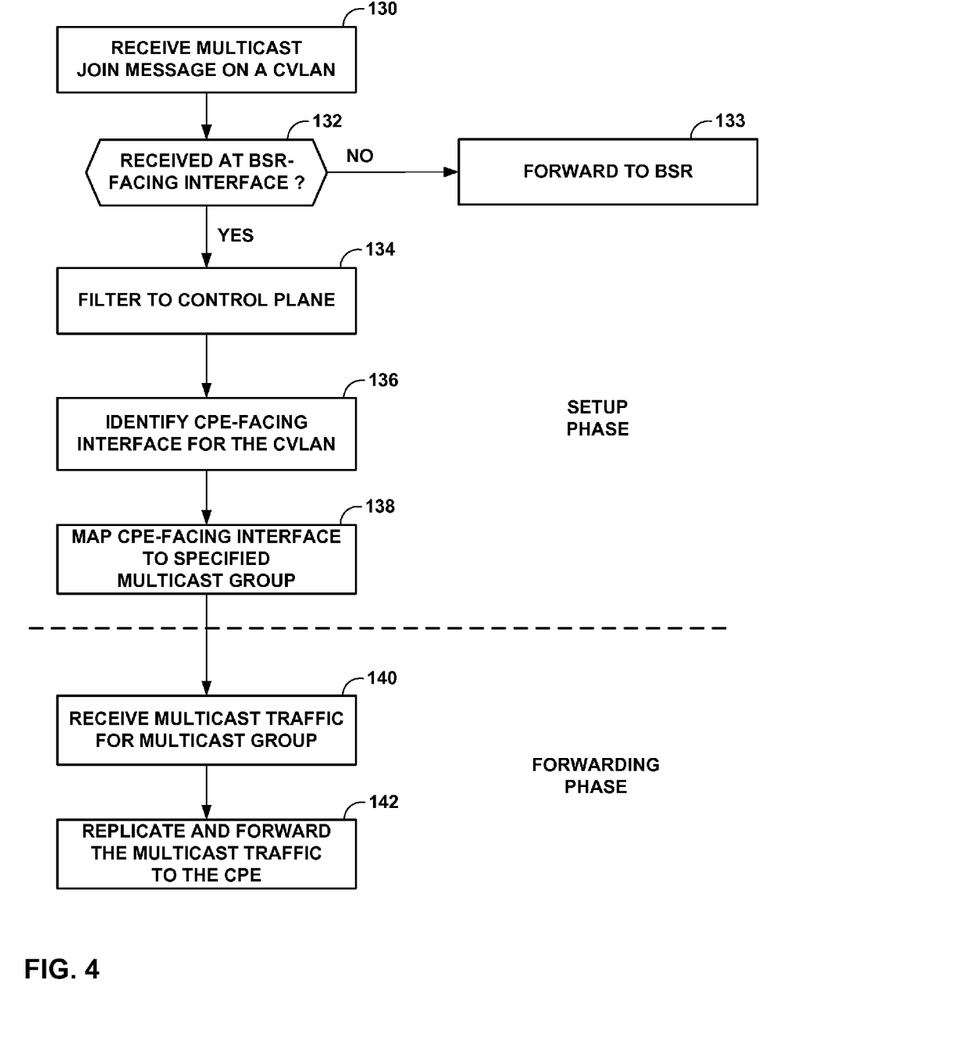
FIG. 4 is a flowchart illustrating an example operation of an example access node to pass through upstream multicast join messages and filter downstream multicast join messages per the techniques of this disclosure.

FIG. 4 is a flowchart illustrating an example operation of access node 6 of FIG. 2 to pass-through upstream multicast join messages and filter downstream multicast join messages per the techniques of this disclosure. Access node 6 receives a multicast join interface at one of IFCs 40 (130), and packet forwarding unit 48, as directed by forwarding information 36, determines that the message include L3 multicast signaling information and further determines the receiving interface (132). If the multicast join message is received at a subscriber-facing interface (NO branch of 132), the multicast join message is directed upstream toward the upstream router and is forwarded thereto by packet forwarding unit 48 in accordance with forwarding information 36 without snooping (133). If, however, the multicast join message is received at an upstream router-facing interface (YES branch of 132), packet forwarding unit 48 snoops the received message by filtering the message to direct the message to multicast filtering module 38 of control plane 32 for analysis (134). Multicast filtering module 38 determines the subscriber-facing interface for the CVLAN on which the multicast join request was received by access node 6 (136). Multicast filtering module 38 then maps the subscriber-facing interface to the requested multicast group specified in the multicast join message in an entry in multicast filter information 35 and updates packet forwarding unit 48 with the modified filter information, e.g., by way of dynamically programming the updated filter information into forwarding information of the packet forwarding unit (138). At this time, multicast filtering module 35 may then drop the multicast join message so that the message is not re-forwarded, e.g., toward BSR 12.

Subsequently, access node 6 receives multicast traffic associated with the multicast group from the upstream router (140). Packet forwarding unit 48 uses the multicast group address within the multicast traffic as a lookup to multicast filter information 35, which maps the outbound interface to the multicast group address in a filter entry. Packet forwarding unit 48 therefore elaborates (i.e., replicates and forwards) the multicast traffic to the issuing/requesting subscriber device (142).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable medium or computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
receiving, by a services router from a layer 2 (L2) network device located between the services router and a subscriber device, a multicast join request that specifies a requested multicast group for the subscriber device and indicates a request by the subscriber device to receive multicast traffic associated with the requested multicast group, wherein the multicast join request comprises an Internet Protocol (IP) packet header having a protocol field that specifies an Internet Group Management Protocol (IGMP);
authorizing, by the services router, a subscriber associated with the subscriber device to receive the multicast traffic associated with the requested multicast group; and
by the services router, only when the subscriber is authorized to receive the multicast traffic associated with the requested multicast group, outputting the multicast join request from the services router toward the L2 network device, wherein the outputted multicast join request comprises the IP packet header having the protocol field that specifies the IGMP.

2. The method of claim 1,
wherein outputting the multicast join request from the services router toward the L2 network device comprises generating, by the services router, a modified multicast join request by encapsulating the multicast join request received from the L2 network device with an L2 header and sending the modified multicast join request toward the L2 network device.

3. The method of claim 1, further comprising:
only when the subscriber is not authorized to receive multicast traffic associated with the requested multicast group, dropping the multicast join request.

4. The method of claim 1,
wherein receiving the multicast join request comprises receiving, by the services router, the multicast join request on a customer virtual local area network (CVLAN) for the subscriber device, and
wherein outputting the multicast join request from the services router toward the L2 network device comprises outputting, by the services router, the multicast join request toward the L2 network device on the CVLAN for the subscriber device.

5. The method of claim 1, wherein authorizing the subscriber associated with the subscriber device comprises requesting, by the services router, authorization for the subscriber associated with the subscriber device from an accounting, authorization, and authentication server.

6. The method of claim 1, further comprising:
forwarding, by the services router, multicast traffic for the requested multicast group to the L2 network device.

7. The method of claim 1, further comprising:
mapping, by the services router, the requested multicast group to an L2 address for the subscriber device and storing the mapping;
after storing the mapping, determining the L2 address for the subscriber device using the mapping; and
outputting a multicast leave group message toward the L2 network device to remove the subscriber device from a list of receivers for the requested multicast group, wherein the multicast leave group message specifies the requested multicast group and comprises an L2 source address that is set to the L2 address for the subscriber device.

8. The method of claim 1,
wherein the multicast join request comprises a first L2 header having an L2 source address that is set to an L2 address of the subscriber device, and
wherein the outputted multicast join request comprises a second L2 header having an L2 source address that is set to the L2 address of the subscriber device.

9. The method of claim 1, wherein the outputted multicast join request indicates the subscriber is authorized to receive multicast traffic associated with the requested multicast group.

10. A services router comprising:
a memory; and
one or more processors, the one or more processors configured to execute:
a service request handler configured to receive, from a layer 2 (L2) network device located between the services router and a subscriber device, a multicast join request that specifies a requested multicast group for the subscriber device and indicates a request by the subscriber device to receive multicast traffic associated with the requested multicast group, wherein the multicast join request comprises an Internet Protocol (IP) packet header having a protocol field that specifies an Internet Group Management Protocol (IGMP); and
an authorization module configured to authorize a subscriber associated with the subscriber device to receive the multicast traffic associated with the requested multicast group,
wherein the service request handler is further configured to, only when the subscriber is authorized to receive the multicast traffic associated with the requested multicast group, output the multicast join request toward the L2 network device, wherein the outputted multicast join request comprises the IP packet header having the protocol field that specifies the IGMP.

11. The services router of claim 10,
wherein to output the multicast join request toward the L2 network device the service request handler is further configured to generate a modified multicast join request by encapsulating the multicast join request received from the L2 network device with an L2 header and output the modified multicast join request toward the L2 network device.

12. The services router of claim 10, wherein the service request handler is further configured to, only when the subscriber is not authorized to receive multicast traffic associated with the requested multicast group, drop the multicast join request.

13. The services router of claim 10,
wherein to receive the multicast join request the service request handler is configured receive the multicast join request on a customer virtual local area network (CVLAN) for the subscriber device, and wherein to output the multicast join request toward the L2 network device the service request handler is configured to output the multicast join request toward the L2 network device on the CVLAN for the subscriber device.

14. The services router of claim 10, further comprising:
an accounting, authorization, and authentication client configured to request authorization for the subscriber associated with the subscriber device from an accounting, authorization, and authentication server.

15. The services router of claim 10, where the one or more processors are further configured to forward multicast traffic for the requested multicast group to the L2 network device.

16. The services router of claim 10, wherein the service request handler is further configured to:
map the requested multicast group to an L2 address for the subscriber device and store the mapping;
after storing the mapping, determine the L2 address for the subscriber device using the mapping; and
output a multicast leave group message toward the L2 network device to remove the subscriber device from a list of receivers for the requested multicast group, wherein the multicast leave group message specifies the requested multicast group and comprises an L2 source address that is set to the L2 address for the subscriber device.

17. The services router of claim 10,
wherein the multicast join request comprises a first L2 header having an L2 source address that is set to an L2 address of the subscriber device, and
wherein the outputted multicast join request comprises a second L2 header having an L2 source address that is set to the L2 address of the subscriber device.

18. A non-transitory computer-readable medium comprising instructions for causing at least one programmable processor of a services router to:

receive, from a layer 2 (L2) network device located between the services router and a subscriber device, a multicast join request that specifies a requested multicast group for the subscriber device and indicates a request by the subscriber device to receive multicast traffic associated with the requested multicast group, wherein the multicast join request comprises an Internet Protocol (IP) packet header having a protocol field that specifies an Internet Group Management Protocol (IGMP);

authorize a subscriber associated with the subscriber device to receive the multicast traffic associated with the requested multicast group; and only when the subscriber is authorized to receive the multicast traffic associated with the requested multicast group, output the multicast join request from the services router toward the L2 network device, wherein the outputted multicast join request comprises the IP packet header having the protocol field that specifies the IGMP.

\* \* \* \* \*